United States Patent
Liu et al.

(10) Patent No.: US 10,392,504 B2
(45) Date of Patent: Aug. 27, 2019

(54) REACTIVE EPOXY COMPOUNDS AND METHOD FOR PRODUCING THE SAME, CORE-SHELL TYPE EPOXY RESIN PARTICLES, WATERBORNE EPOXY RESIN COMPOSITION, AND COATING COMPOSITION CONTAINING THE REACTIVE EPOXY COMPOUNDS

(71) Applicant: CHANG CHUN PLASTICS CO., LTD., Taipei (TW)

(72) Inventors: Liang-Hsing Liu, Taipei (TW); Ying-Jui Lin, Taipei (TW); Yung-Sheng Lin, Taipei (TW); I-Chiang Lai, Taipei (TW); Kuen-Yuan Hwang, Taipei (TW); Yi-Sern Wong, Taipei (TW)

(73) Assignee: Chang Chun Plastics Co., LTD., Taipei (TW)

( * ) Notice: Subject to any disclaimer, the term of this patent is extended or adjusted under 35 U.S.C. 154(b) by 0 days.

(21) Appl. No.: 16/100,790

(22) Filed: Aug. 10, 2018

(65) Prior Publication Data

US 2019/0055397 A1 Feb. 21, 2019

Related U.S. Application Data

(60) Provisional application No. 62/545,808, filed on Aug. 15, 2017.

(51) Int. Cl.
| | |
|---|---|
| *C08L 63/04* | (2006.01) |
| *C08G 59/16* | (2006.01) |
| *C08G 59/14* | (2006.01) |
| *C09D 163/04* | (2006.01) |
| *C08G 59/40* | (2006.01) |

(52) U.S. Cl.
CPC .......... *C08L 63/04* (2013.01); *C08G 59/1455* (2013.01); *C08G 59/1477* (2013.01); *C09D 163/04* (2013.01); *C08G 59/4014* (2013.01); *C08G 2150/90* (2013.01); *C08L 2207/53* (2013.01)

(58) Field of Classification Search
CPC . C08L 63/04; C08L 2207/53; C08G 59/1455; C08G 59/1477; C08G 59/4014; C08G 2150/90; C09D 163/04
USPC ........................................................ 523/426
See application file for complete search history.

(56) References Cited

U.S. PATENT DOCUMENTS

| | | | |
|---|---|---|---|
| 2005/0022929 A1* | 2/2005 | Schoenfeld | C09J 5/06 156/272.2 |
| 2010/0240794 A1* | 9/2010 | Jin | A61K 6/083 523/115 |
| 2013/0090413 A1 | 4/2013 | Kawahara et al. | |

* cited by examiner

*Primary Examiner* — David T Karst
(74) *Attorney, Agent, or Firm* — Nixon Peabody LLP; Thomas P. Pavelko

(57) ABSTRACT

This disclosure relates to reactive epoxy compounds that have high water solubility. The reactive epoxy compounds are obtained by mixing an epoxy resin having at least two epoxy groups per molecule with a carboxyl group-containing compound obtained by reacting a polyetheramine comprising a primary amine and an acid anhydride derived from a polyvalent carboxylic acid. This disclosure also relates to waterborne epoxy resin composition comprising core-shell type epoxy resin particles dispersed in a solvent, wherein the particles are formed by an epoxy resin encapsulated in the reactive epoxy compounds of the present invention. The waterborne epoxy resin composition is low in volatile organic compounds ("VOC").

15 Claims, No Drawings

REACTIVE EPOXY COMPOUNDS AND METHOD FOR PRODUCING THE SAME, CORE-SHELL TYPE EPOXY RESIN PARTICLES, WATERBORNE EPOXY RESIN COMPOSITION, AND COATING COMPOSITION CONTAINING THE REACTIVE EPOXY COMPOUNDS

CROSS REFERENCE TO RELATED APPLICATIONS

This United States Non-provisional application claims domestic benefit under 35 U. S. C. § 119 of U.S. Provisional patent application Ser. No. 62/545,808, filed Aug. 15, 2017, the entire disclosure of which is herein incorporated by reference.

FIELD

This disclosure relates to reactive epoxy compounds that can also act as a reactive surfactant. The reactive epoxy compounds have high water solubility. This disclosure also relates to a waterborne epoxy resin composition comprising core-shell type epoxy resin particles dispersed in a solvent, wherein the particles are formed by an epoxy resin encapsulated in the reactive epoxy compounds. The waterborne epoxy resin composition is low in volatile organic compounds ("VOC"). Particle size control by molecular design of the reactive epoxy compounds can produce particle sizes on the order of about 0.7 μm. When mixed with a curing agent, such as a waterborne amine curing agent, and coated onto a substrate, the particle size (or surface area) of the waterborne epoxy resin composition and curing agent have great influence on the curing reaction of the coating film. The waterborne epoxy resin composition is low in volatile organic compounds ("VOC") and has great properties in the resulting films of strengthened corrosion resistance and water resistance.

BACKGROUND

The waterborne epoxy resins market is anticipated to grow at a steady rate and will post a compound annual growth rate ("CAGR") of close to 8% during the forecast period. The increasing shift toward green and eco-friendly products will drive the growth prospects for the global waterborne epoxy resins market until the end of 2021.

Generation 1 water-based epoxy resins are epoxy resin emulsions prepared by high-speed stirring in a homogenizing mixer using a surfactant. The disadvantages of those epoxy resin emulsions are poor water resistance, poor adhesion to substrates or top coats, and low mechanical stability, all due to the presence of the surfactants. US 2013/0090413A1 disclosed a water-soluble epoxy resin obtained by causing an epoxy resin (B) to react with a carboxyl-group-containing compound (A) obtained by reacting a polyethylene glycol monoalkyl ether (A-1) and an acid anhydride (A-2). The water-soluble epoxy resin has high water-solubility and maintains emulsion stability for epoxy resins.

SUMMARY

Although the above mentioned US 2013/0090413A1 already disclosed a water-soluble epoxy resin, the inventors of the present invention found that the water-soluble epoxy resin contains an ester bond derivates from reacting the polyethylene glycol monoalkyl ether (A-1) and the acid anhydride (A-2). It is known that compounds having ester bond is prone to hydrolysis. Therefore, it is an object of the present invention to provide a new class of reactive epoxy compounds, which not only acts as an epoxy resin but also acts as reactive surfactant, that are high solubility in water, and provide improved properties of corrosion resistance and water resistance of the resulting cured coatings or films. In addition, compared to the prior water-soluble epoxy resin, the reactive epoxy compounds of the present invention have amide bond, which exhibits excellent stability and is hard to hydrolyze. Furthermore, because the amide bond can form hydrogen bond when reacting with water, the reactive epoxy compounds of the present invention can dissolve in water to maintain emulsion stability for epoxy resins. This class of reactive epoxy compounds can be represented by general formula (I) as follows:

wherein Y represents an aliphatic, cycloaliphatic, or aromatic group; $X_1$ represents

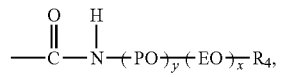

wherein $R_4$ is an organic linking group; $X_2$ represents

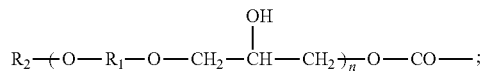

wherein $R_1$ is an organic linking group (typically a saturated or unsaturated hydrocarbon group including substituted or unsubstituted hydrocarbon group); $R_2$ represents glycidyl ether groups or other organic linking groups; $X_3$ represents $R_3$—$(CO)_z$—; wherein $R_3$ is hydrogen or an organic linking group which can contain ester, ether, amine, epoxy groups or other linkage types; n represents the number of repeating units and is an integer of from 1 to 20; x represents the number of repeating units and is an integer of from 0 to 40; y represents the number of repeating units and is an integer of from 0 to 40; and z represents the number of repeating units and is an integer of from 0 to 10.

According to one embodiment of this disclosure, the reactive epoxy compound of the present invention and an epoxy resin are mixed together and form a core-shell type particle in which the epoxy resin is encapsulated in the reactive epoxy compound.

It is a still further object of the invention to provide a waterborne epoxy resin composition that comprises the aforesaid core-shell type epoxy resin particles dispersed in a solvent.

It is a still further object of the invention to provide a coating composition that comprises the aforesaid waterborne epoxy resin composition mixed with a curing agent and any other additives, and then is coated and dried to form a cured coating film of strengthened corrosion resistance and improved water resistance.

It is a still further object of this disclosure to provide automotive and marine applications of an epoxy coating that will act as a primer to prevent corrosion and assure adhesion of paints on automobiles, trucks, tractors and other land vehicles and on boats, ships and other marine vessels.

It is a further object of this disclosure to provide steel corrosion resistant coatings in steel pipes and fittings used in the oil and gas industry, water transmission pipelines and other piping conduits where corrosion is prevalent.

It is a still further object of this disclosure to provide metal container coatings and can coatings, especially where such metal containers and cans are used to package acidic foods.

It is a further object to provide coatings for flooring applications, especially in industrial applications, where the epoxy coatings of this disclosure can be used as flooring coatings in factories, warehouses, garages and other industrial sites where flooring protection is required.

These and other objects of the disclosure will be understood in connection with the following detailed description.

DETAILED DESCRIPTION

The reactive epoxy compounds are shown as the above formula (I). In the disclosure, the term "organic linking group" for $R_1$ refers to functional groups containing carbon atom, preferably a saturated or unsaturated hydrocarbon group including substituted or unsubstituted hydrocarbon group. Examples of $R_1$ are shown as follows:

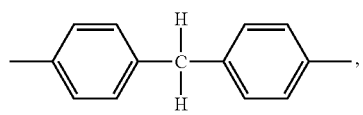

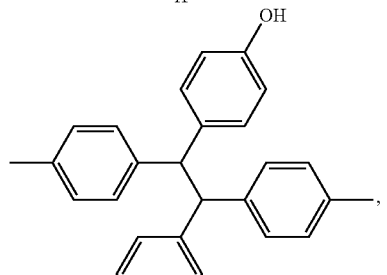

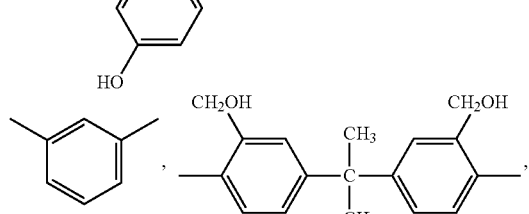

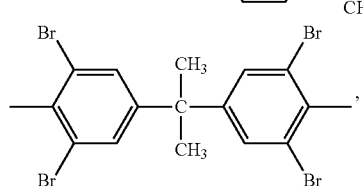

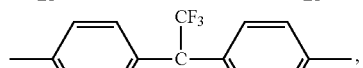

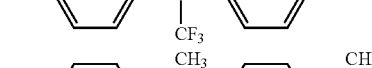

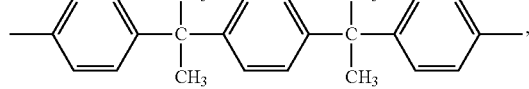

-continued

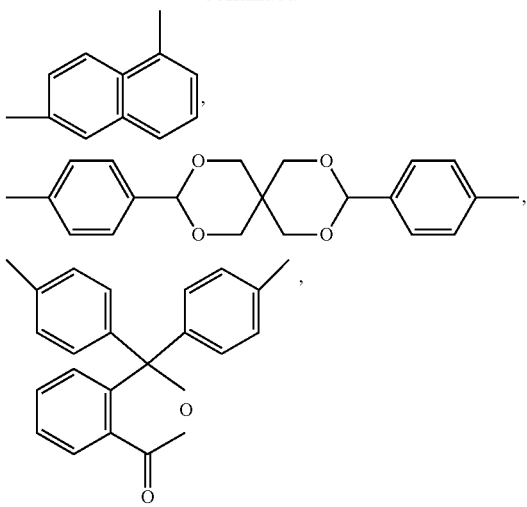

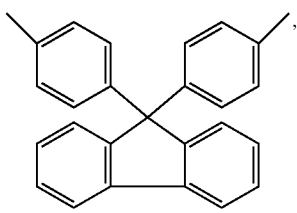

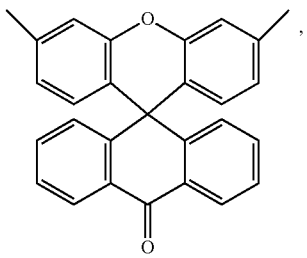

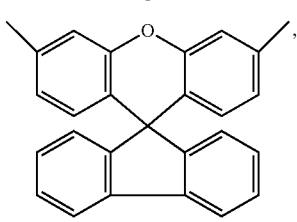

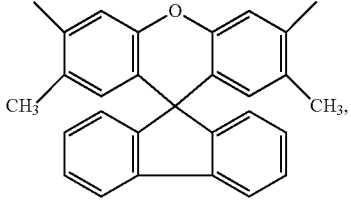

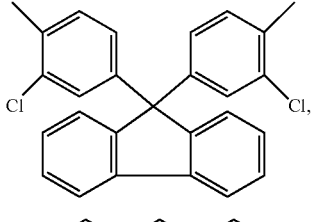

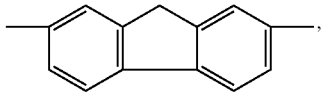

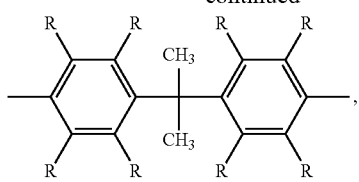

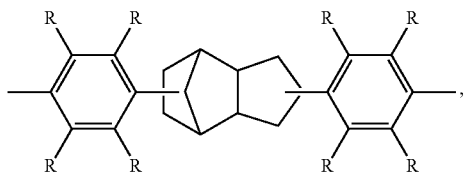

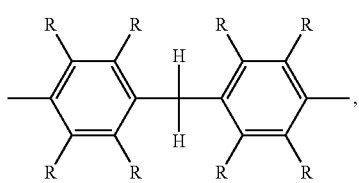

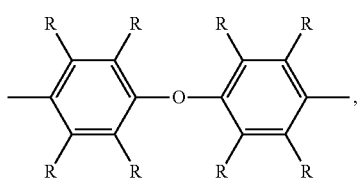

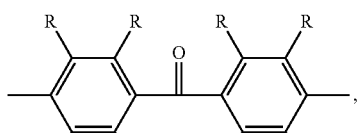

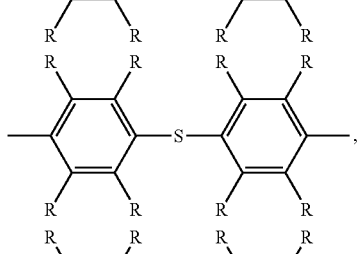

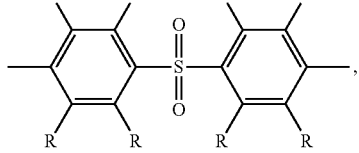

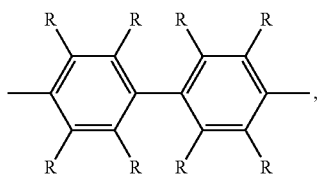

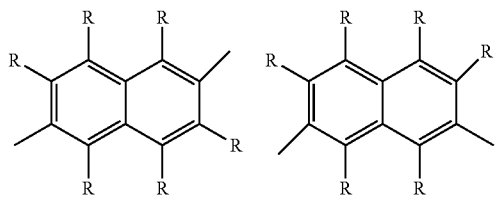

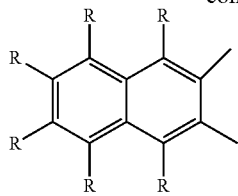

wherein each R is independently selected from the group consisting of H, C1-C10 alkyl, C1-C10 alkoxy, a cyclic alkyl group having 3-10 carbon atoms, phenyl, and a phenoxyl group. In some cases, R is independently H or a C1-C10 alkyl.

In the disclosure, the term "organic linking group" for $R_2$ refers to any functional groups containing epoxy groups. Examples of $R_2$ are shown as follows:

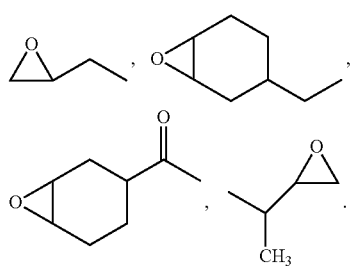

In the disclosure, the term "organic linking group" for $R_3$ refers to any functional groups containing ester, ether, amine, epoxy groups. Examples of $R_3$ are shown as follows:

$$H_3C\left(O\right)_{31}\left(O\right)_{10}N\overset{H}{\underset{CH_3}{|}}-,$$

$$\underset{O}{\triangle}\!\!\!-\!\!O\!\!-\!\!\!\!\bigcirc\!\!\!\!-\!\!\overset{CH_3}{\underset{CH_3}{\overset{|}{C}}}\!\!-\!\!\!\!\bigcirc\!\!\!\!-\!\!O\!\!-\!\!\!\!\overset{}{\underset{OH}{\overset{}{\phantom{|}}}}\!\!\!\!-\!\!O\!\!-,$$

$$H\!\left(O\!\!\sim\!\!\right)_{76}\!\!O\!\sim,$$

$$R_2\!\!-\!\!(O\!\!-\!\!R_1\!\!-\!\!O\!\!-\!\!CH_2\!\!-\!\!\overset{OH}{\underset{|}{C}H}\!\!-\!\!CH_2)_{m}\!\!-\!\!O\!\!-,\ R_4\!\!-\!\!\overset{H}{\underset{|}{N}}\!\!-,$$

$$H\!\left(O\!\sim\!\right)_{p}\!\!O\!\sim\!\!-\!\!\overset{}{\underset{OH}{\overset{|}{C}H}}\!\!-\!\!(O\!\!-\!\!R_1\!\!-\!\!O\!\!-\!\!CH_2\!\!-\!\!\overset{OH}{\underset{|}{C}H}\!\!-\!\!CH_2)_{q}\!\!-\!\!O\!\!-;$$

wherein m represents the number of repeating units and is an integer of from 1 to 20, p represents the number of repeating units and is an integer of from 22 to 76 and q represents the number of repeating units and is an integer of from 1 to 20.

In the disclosure, the term "organic linking group" for $R_4$ refers to alkyl ether group or alkyl group. In the disclosure, "EO" refers to ethylene oxide groups and "PO" refers to propylene oxide groups.

As suitable reactive epoxy compounds within general formula (I) can be mentioned the following compounds S1-S5 having the following structures:

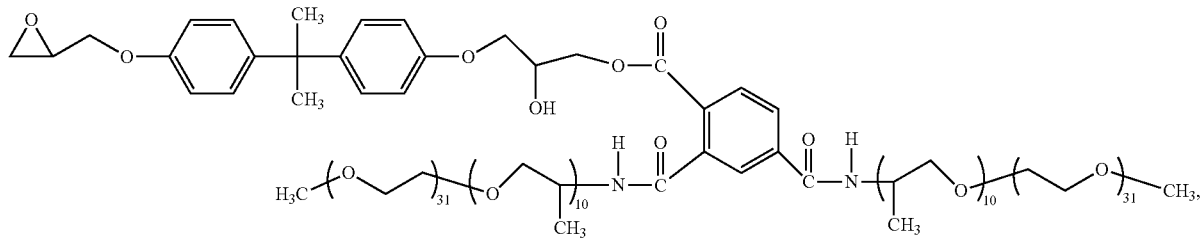

S1

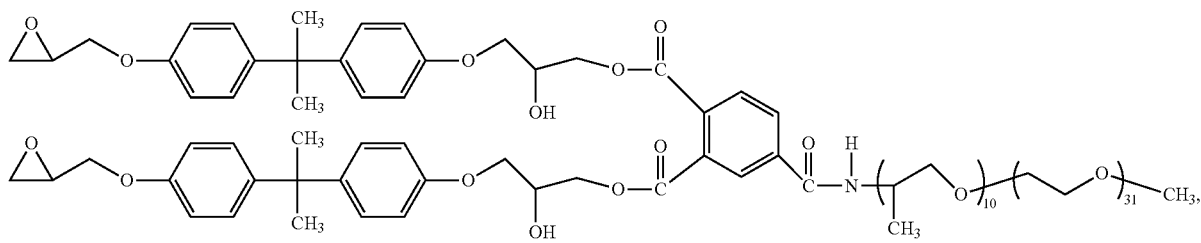

S2

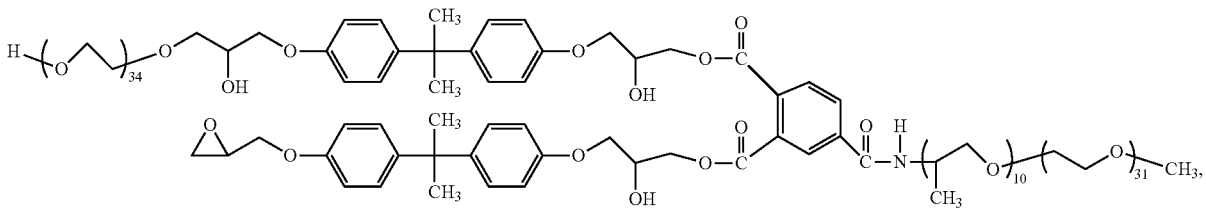

S3

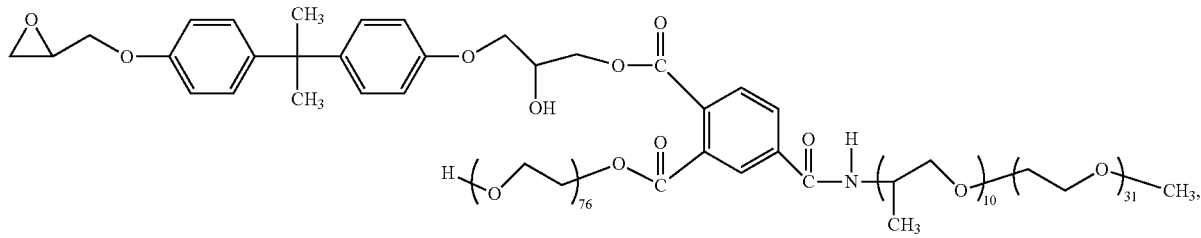

S4

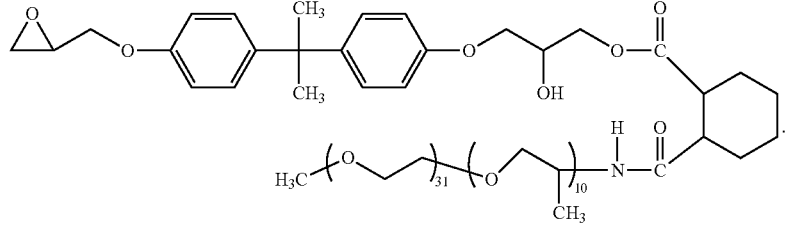

S5

One of the important features of the reactive epoxy compounds of the present invention shown as the above formula is that the compounds have amide bond, which exhibits excellent stability and is hard to hydrolyze. Furthermore, because the amide bond can form hydrogen bond when reacting with water, the reactive epoxy compounds of the present invention can dissolve in water to maintain emulsion stability for epoxy resins.

One of the applications of the reactive epoxy compounds of the present invention is to act as a surfactant, which is mixed with an epoxy to form core-shell type epoxy resin particles wherein the epoxy resin is encapsulated in the reactive epoxy compounds. The epoxy resin can be any known epoxy resin, e.g., a BPA epoxy resin, an epoxy resin obtained from epichlorohydrin or β-methylepichlorohydrin and bisphenol A, bisphenol F, or bisphenol sulfone, polyglycidyl ethers of polyhydric alcohols such as polyglycidyl ethers of phenol novolac resins and cresol novolac resins, polyglycidyl ethers of alkylene oxide adducts of bisphenol A, polypropylene glycol, 1,6-hexanediol, trimethylolpropane, and glycerin, polyglycidyl ethers of polycarboxylic acid such as adipic acid, phthalic acid, and dimer acid, and polyglycidylamines.

As for the mixing ratios of the reactive epoxy compounds and the epoxy resin in the core-shell type epoxy resin particles, the ratio of the former is preferably in the range of 10 to 50 parts by mass and the ratio of the latter is preferably in the range of 90 to 50 parts by mass. As for the particle size of the core-shell type epoxy resin particles, which is determined in a form that the particles are dispersed in a solvent (for example, the waterborne epoxy resin composition of the present invention as an embodiment), have a distribution of particle size that $D_{50}$ of the particle size is less than about 0.7 μm (50% of the particles are smaller than the $D_{50}$ value). The core (epoxy resin)-shell (reactive epoxy compounds) type epoxy resin particles having such small size not only exhibit excellent dispersibility in solvents but also have elevated surface area for further reacting with curing agent. In addition, since the shell (reactive epoxy compounds) contains epoxy groups, thus exhibits affinity with other epoxy groups.

A waterborne epoxy resin composition comprising the above mentioned core-shell type epoxy resin particles dispersed in a solvent is provided. The solvent may be water or a mixture of water and a water-soluble solvent. The water-soluble solvent may be any solvent that is inactive to these components. Examples thereof include esters, alcohols, glymes, propylene glycol monoalkyl ethers, and propylene glycol mono-tert-butyl ether, and ketones. The solids content of the waterborne epoxy resin composition is defined by the following formula "A":

Solids content (%)=(weight of core-shell type epoxy resin particles)/(total weight of waterborne epoxy resin composition)×100%

The total weight of the waterborne epoxy resin composition in the above formula includes the core-shell type epoxy resin particles and the solvent. An example of the total solids content can be given in connection with product number S6 in Table 4 below. Weight of reactive epoxy compounds (S1) is 50 g and the weight of epoxy resin (BE501) is 200 g. The solvent includes the weight of the propylene glycol monomethyl ether of 20.83 g plus the weight of pure water, which is 200 g. Applying theses values in formula "A" gives the following:

Solids content (%)=(200+50)/(200+50+20.83+200)× 100%=53.10%

While product S6 had the weight of a total solvent content of 220.83 g (20.83 g propylene glycol monomethyl ether+ 200 g pure water), the weight of the core-shell type epoxy resin particles of 250 g (50 g reactive epoxy compounds (S1)+200 g epoxy resin (BE501)), and the solids content of 53.10% is provided as an example. However, the 53.10% solids content of the S6 product is one example, but not limiting of the disclosure of percentage solids content. In a preferred embodiment, the solid content (%) of the waterborne epoxy resin composition of the present invention is from 10% to 99%, for example: 10%, 15%, 20%, 25%, 30%, 35%, 40%, 45%, 50%, 55%, 60%, 65%, 70%, 75%, 80%, 85%, 90%, 95%, or 99%; further preferred examples are from 20% to 80%, for example: 20%, 25%, 30%, 35%, 40%, 45%, 50%, 55%, 60%, 65%, 70%, 75%, or 80%.

The waterborne epoxy resin composition is mixed with a curing agent and any other additives, such as dyes, colorants, anti-foaming agents, etc, and the obtained coating composition can then be coated on a substrate to form a coating. Examples of the basic curing agent include aliphatic polyamines, alicyclic polyamines, Mannich bases, amine-epoxy addition products, polyamide polyamines, and liquid aromatic polyamines. Examples of the curing agent are JOINTMINE #4160 and EPIKURE Curing Agent 8530-W-75(HEXION). The coating composition can be coated on a substrate by spraying, brushing, curtain coating, spreading with an air-knife and other techniques for forming coatings. When dried, the resulting cured, coating film has excellent corrosion and water resistance.

The invention further discloses method for producing the reactive epoxy compounds of the invention, comprising mixing an epoxy resin having at least two epoxy groups per molecule with a carboxyl group-containing compound (C) obtained by reacting a polyetheramine (C-1) comprising a primary amine and an acid anhydride (C-2) derived from a polyvalent carboxylic acid. It shall be noted that there is no specific order for the above reaction, namely, the acid anhydride (C-2) can firstly react with the epoxy resin, and then further react with the polyetheramine (C-1).

The epoxy resin for producing the reactive epoxy compounds of the invention can be any known epoxy resin or epoxy resin containing the $R_1$ and $R_2$ groups as defined above, such as, but is not limited to, the epoxy resin obtained from epichlorohydrin or β-methylepichlorohydrin and bisphenol A, bisphenol F, or bisphenol sulfone, polyglycidyl ethers of polyhydric alcohols such as polyglycidyl ethers of phenol novolac resins and cresol novolac resins, polyglycidyl ethers of alkylene oxide adducts of bisphenol A, polypropylene glycol, 1,6-hexanediol, trimethylolpropane, and glycerin, polyglycidyl ethers of polycarboxylic acid such as adipic acid, phthalic acid, and dimer acid, and polyglycidylamines.

The polyether amines include at least one member selected from the group consisting of poly(alkylene oxide) monoamines, diamines and triamines. Exemplary polyether amines include poly(ethylene oxide), poly(propylene oxide) and poly(tetramethylene oxide) monoamines, diamines and triamine. Poly(propylene oxide) monoamines, diamines and triamines useful in the present disclosure are commercially available under the Jeffamine® trademark. Illustrative examples include, but are not limited to, at least one of poly(ethylene glycol-block-propylene glycol) (2-amino-2-methyl)methyl ether (available as Jeffamine® M-600, Jeffamine® M-1000, Jeffamine® M-2005, and Jeffamine® M-2070), poly(ethylene glycol-block-propylene glycol)bis (2-amino-2-methyl)ether (available as Jeffamine® ED600, ED900, and ED 2001), tri(2-amino-2-methylethyl)trimethylolpropane ether (available as Jeffamine® T-403), tri(2-amiono-poly(propylene oxide))glycerine ether (available as Jeffamine® T-5000), bis(3-aminopropyl)polypropylene glycol ether (Jeffamine® D230, D400, D2000, and D4000) and any combination thereof. Poly(ethylene oxide) monoamines, diamines and triamines include, but are not limited to, at least one of triethylene glycol diamine (available as Jeffamine® XTJ 504), bis(3-aminopropyl)diethylene glycol ether (available as Ancamine® 1922A), di(2-aminopropylated) diethylene glycol (also referred to as bis(2-amino-2-methylethyl) diethylene glycol ether, available as Jeffamine® XTJ-511), poly(ethylene oxide) methyl (3-aminopropyl) ether, poly(ethylene glycol)diamine (available as Jeffamine® XTJ-512), poly(ethylene oxide)bis(3-amino-propyl) ether and any combination thereof. Poly(tetramethylene oxide) monoamines, diamines and triamine include but are not limited to at least one of bis(3-aminopropyl)polytetrahydrofuran (Mn 350), bis(3-aminopropyl)polytetrahydrofuran (Mn 750), poly(propylene oxide-block-tetramethylene oxide)bis(2-amino-2-methylethyl)ether (available as Jeffamine® XTJ-533, and XTJ-536) and any combination thereof. The preferred monoamine is Jeffamine® M-2070 amine which is a monoamine terminated block copolymer of propylene oxide and ethylene oxide having a Mn=2000. These amines are mixed with an acid anhydride (C-2) derived from a polyvalent carboxylic acid. The acid anhydride has two, three, four or six functional groups per molecule. The acid anhydride having two functional groups is at least one selected from the group consisting of phthalic acid anhydride, glycerol tris-mellitate, maleic anhydride, tetrahydrophthalic acid anhydride, methyltetrahydrophthalic acid anhydride, endomethylenetetrahydrophthalic acid anhydride, methylendometylenetetrahydrophthalic acid anhydride, methylbutenyltetrahydrophthalic acid anhydride, dodecenylsuccinic acid anhydride, hexahydrophthalic acid anhydride, methylhexahydrophthalic acid anhydride, succinic acid anhydride, methylcyclohexene-dicarboxylic acid anhydride, chlorendic acid anhydride, tetrabromophthalic acid anhydride, polyazelaic acid anhydride, fumaric acid anhydride, itaconic acid anhydride, acrylic acid anhydride and methacrylic acid anhydride. Acid anhydride having three functional groups includes trimellitic acid anhydride. Acid anhydrides having at least four functional groups is at least one selected from the group consisting of pyromellitic acid anhydride, benzophenone-tetracarboxylic acid anhydride and ethylene glycol bis-trimellitate acid anhydride. Acid anhydrides having at least six functional groups include alkylstyrene-maleic anhydride copolymers.

The present invention is to be further described through the following examples, but these examples are only for the purpose of illustration rather than limiting the scope of the present invention.

EXAMPLES

Example 1—Synthesis of the Reactive Epoxy Compound (S1)

9.6 g of Trimellitic anhydride (TMA) was mixed with 200 g of a polyetheramine available from HUNTSMAN, under the name Jeffamine® M-2070 to react under 120° C. with 0.04 g of triphenylphosphine (TPP) as catalyst. 18.8 g of a Bisphenol-A epoxy available from CCP, under the name BE188 and 0.05 g of TPP were further added into the reaction to react under 140° C. The final product has the above defined structure of S1 with an acid value of 0.77.

Example 2—Synthesis of the Reactive Epoxy Compound (S2)

24 g of Trimellitic anhydride (TMA) was mixed with 250 g of a polyetheramine available from HUNTSMAN, under the name Jeffamine® M-2070 to react under 120° C. with 0.05 g of triphenylphosphine (TPP) as catalyst. 94 g of a Bisphenol-A epoxy available from CCP, under the name BE188 and 0.07 g of TPP were further added into the reaction to react under 140° C. The final product has the above defined structure of S2 with an acid value of 0.68.

Example 3—Synthesis of the Reactive Epoxy Compound (S3)

9.6 g of Trimellitic anhydride (TMA) was mixed with 93.8 g of PEG1500-BE188 to react under 120° C. with 0.02 g of triphenylphosphine (TPP) as catalyst. 100 g of a polyetheramine available from HUNTSMAN, under the name Jeffamine® M-2070 was further added into the reaction to react under 120° C. with 0.04 g of TPP. Finally, 18.8 g of a Bisphenol-A epoxy available from CCP, under the name BE188 and 0.04 g of TPP were further added into the reaction to react under 140° C. The final product has the above defined structure of S3 with an acid value of 0.94.

Example 4—Synthesis of the Reactive Epoxy Compound (S4)

9.6 g of Trimellitic anhydride (TMA) was mixed with 167.5 g of PEG3350 to react under 150° C. with 0.035 g of triphenylphosphine (TPP) as catalyst. 100 g of a polyetheramine available from HUNTSMAN, under the name Jeffamine® M-2070 was further added into the reaction to react under 120° C. with 0.055 g of TPP. Finally, 18.8 g of a Bisphenol-A epoxy available from CCP, under the name BE188 and 0.06 g of TPP were further added into the reaction to react under 150° C. The final product has the above defined structure of S4 with an acid value of 0.55.

Example 5—Synthesis of the Reactive Epoxy Compound (S5)

7.7 g of Hexahydrophthalic acid anhydride (HHPA) was mixed with 100 g of a polyetheramine available from HUNTSMAN, under the name Jeffamine® M-2070 to react under 120° C. with 0.02 g of triphenylphosphine (TPP) as catalyst. 18.8 g of a Bisphenol-A epoxy available from CCP, under the name BE188 and 0.03 g of TPP were further added into the reaction to react under 120° C. The final product has the above defined structure of S5 with an acid value of 0.82.

Comparative Example 1—Synthesis of Comparative Epoxy Compound (C1)

19.2 g of Trimellitic anhydride (TMA) was mixed with 37.6 g of a Bisphenol-A epoxy available from CCP, under the name BE188 to react under 110° C. with 0.02 g of triphenylphosphine (TPP) as catalyst. 37.6 g of a Bisphenol-A epoxy available from CCP, under the name BE188 was further added into the reaction to react under 110° C. with 0.03 g of TPP. Finally, 37.6 g of a Bisphenol-A epoxy available from CCP, under the name BE188 and 0.04 g of TPP were further added into the reaction to react under 110° C. The final product has the following structure of C1 with an acid value of 0.98.

C1

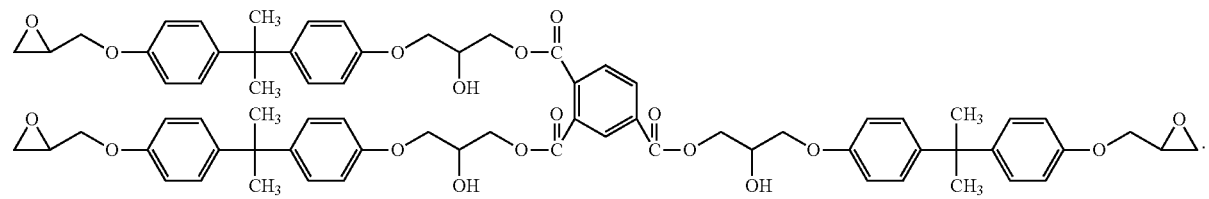

Example 6—Using S1 for Manufacturing Waterborne Epoxy Resin Composition S6

50 g of the above synthesized reactive epoxy compound S1 was mixed with 200 g of a Bisphenol-A epoxy available from CCP, under the name BE501 to form a core (epoxy resin BE501)-shell (reactive epoxy compound S1) epoxy resin particles and the particles were further dispersed in a water-based solvent (200 g water mixed with 20.83 g of propylene glycol monomethyl ether) to form a waterborne epoxy resin composition S6. Particle size of the core-shell type epoxy resin particles of the waterborne epoxy resin composition was measured and the result was shown in the following Table 1. As Table 1 shows, $D_{50}$ of the particle size is less than about 0.4 μm.

TABLE 1

| Distribution Percentiles | |
|---|---|
| Percentiles | Size (μm) |
| 10% | 0.12 |
| 20% | 0.16 |
| 50% | 0.32 |
| 80% | 0.74 |
| 90% | 1.05 |

Example 7—Using S2 for Manufacturing Waterborne Epoxy Resin Composition S7

The same reaction procedure as example 6 was conducted except for the reactive epoxy compound S2 was used rather than S1.

Example 8—Using S3 for Manufacturing Waterborne Epoxy Resin Composition S8

The same reaction procedure as example 6 was conducted except for the reactive epoxy compound S3 was used rather than S1. Particle size of the core-shell type epoxy resin particles of the waterborne epoxy resin composition was measured and the result was shown in the following Table 2. As Table 2 shows, $D_{50}$ of the particle size is less than about 0.7 μm.

TABLE 2

| Distribution Percentiles | |
|---|---|
| Percentiles | Size (μm) |
| 10% | 0.21 |
| 20% | 0.32 |
| 50% | 0.63 |
| 80% | 1.01 |
| 90% | 1.22 |

Example 9—Using S4 for Manufacturing Waterborne Epoxy Resin Composition S9

The same reaction procedure as example 6 was conducted except for the reactive epoxy compound S4 was used rather than S1.

Example 10—Using S5 for Manufacturing Waterborne Epoxy Resin Composition S10

The same reaction procedure as example 6 was conducted except for the reactive epoxy compound S5 was used rather than S1.

Comparative Example 2—Using C1 for Manufacturing Waterborne Epoxy Resin Composition C2

The same reaction procedure as example 6 was conducted except for the reactive epoxy compound C1 was used rather than S1.

Testing Example 1—Waterborne Test for S6 to S10 and C2

Waterborne test is to observe whether the waterborne epoxy resin composition containing the core (epoxy resin BE501)-shell (reactive epoxy compound) type epoxy resin particles can be uniformly dissolved in water, with no delamination phenomenon. As can be seen from the Waterborne Test results in Table 4, each of Examples 6-10 were "OK", while Comparative Example 2 failed.

Testing Example 2—Adhesion Test for Coating Composition Containing S6 to S10 or C2, Respectively This test evaluates the adhesion ability of the coating composition containing either S6, S7, S8, S9, S10, or C2. In accordance with ASTM-D3359, a lattice pattern with either six or eleven cuts in each direction is made in the film to the substrate, pressure-sensitive tape is applied over the lattice and then removed, and adhesion is evaluated by comparison with descriptions and illustrations. The testing result can be differentiated into 6 grades as 5B (the edges of the cuts are completely smooth; none of the squares of the lattice is detached); 4B (small flakes of the coating are detached at intersections; less than 5% of the area is affected); 3B (small flakes of the coating are detached along edges and at intersections of cuts. The area affected is 5 to 15% of the lattice.); 2B (the coating has flaked along the edges and on parts of the squares. The area affected is 15 to 35% of the lattice.); 1B (the coating has flaked along the edges of cuts in large ribbons and whole squares have detached. The area affected is 35 to 65% of the Lattice.) and 0B (Flaking and detachment worse than Grade 1.)

Each of Examples 6 to 10 had edges of cuts which were completely smooth, none of the squares of the lattice is detached when conducted according to the ASTM test. The Comparative Example was not tested for adhesion as it failed the Waterborne Test.

The following Examples 1-10 and Comparative Examples 1-2 are set forth in tabular form in Tables 3 and 4.

TABLE 3

|  |  | \multicolumn{5}{c|}{Example} | Comparative |
|---|---|---|---|---|---|---|---|
|  |  | 1 | 2 | 3 | 4 | 5 | Ex. 1 |
|  | Reactive epoxy compound No. | S1 | S2 | S3 | S4 | S5 | C1 |
| Step 1 | TMA (g) | 9.6 | 24 | 9.6 | 9.6 |  | 19.2 |
|  | HHPA (g) |  |  |  |  | 7.7 |  |
|  | Polyetheramine Jeffamine® M-2070 (g) | 200 | 250 |  |  | 100 |  |
|  | BE188 (g) |  |  |  |  |  | 37.6 |
|  | PEG1500-BE188 (g) |  |  | 93.8 |  |  |  |
|  | PEG 3350 (g) |  |  |  | 16.75 |  |  |
| Step 2 | Polyetheramine Jeffamine® M-2070 (g) |  |  | 100 | 100 |  |  |
|  | BE188 (g) |  |  |  |  | 18.8 | 37.6 |
| Step 3 | BE188 (g) | 18.8 | 94 | 18.8 | 18.8 |  |  |
| Cat. | TPP (g) | 0.04/0.05 | 0.05/0.07 | 0.02/0.04/0.04 | 0.035/0.055/0.06 | 0.02/0.03 | 0.02/0.03/0.04 |
|  | Acid Value | 0.77 | 0.68 | 0.94 | 0.55 | 0.85 | 0.98 |

TABLE 4

|  | \multicolumn{5}{c|}{Example} | Comparative |
|---|---|---|---|---|---|---|
|  | 6 | 7 | 8 | 9 | 10 | Ex. 2 |
| Product No. | S6 | S7 | S8 | S9 | S10 | C2 |
| Reactive epoxy compound No. | S1 | S2 | S3 | S4 | S5 | C1 |
| Weight for S1 to S5 and C1 | 50 | 50 | 50 | 50 | 50 | 50 |
| BE501 (g) | 200 | 200 | 200 | 200 | 200 | 200 |
| Propylene glycol Monomethyl ether (g) | 20.83 | 20.83 | 20.83 | 20.83 | 20.83 | 20.83 |
| Pure water (g) | 200 | 200 | 200 | 200 | 200 | 200 |
| Solids content (%) | 53.10 | 53.10 | 53.10 | 53.10 | 53.10 | 53.10 |
| Waterborne test | OK | OK | OK | OK | OK | FAIL |
| Adhesion test | 5B | 5B | 5B | 5B | 5B | N.D. |

Note 1: BE188 as referenced in table 3 has the structure:

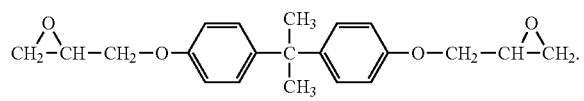

BE188

Note 2: BE501 as referenced in table 4 has the structure:

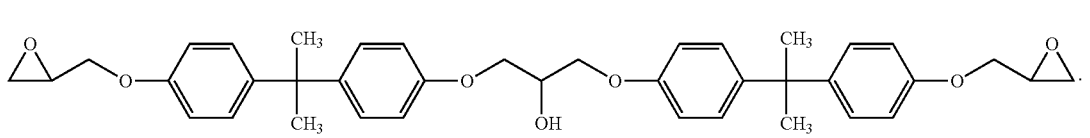

BE501

Note 3: Polyetheramine Jeffamine® M-2070 as referenced in table 3 has the structure:

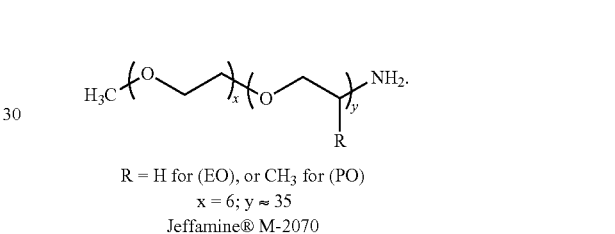

R = H for (EO), or $CH_3$ for (PO)

x = 6; y ≈ 35

Jeffamine® M-2070

Note 4: Acid value ("AV") is the mass of potassium hydroxide (KOH), in milligrams, that is required to neutralize one gram of chemical substance. Calculation of Acid Value: Acid Value (AV) (mg KOH/g)=56.1*N*A/M.

Note 5: Polyethylene Glycol 1500 (PEG1500) as referenced in table 3 has the molecular weight about 1500 Da.

Note 6: Polyethylene Glycol 3350 (PEG3350) as referenced in table 3 has the molecular weight about 3350 Da.

According to the above, the present invention provides a new class of reactive epoxy compounds, which not only acts as an epoxy resin but also acts as reactive surfactant, that are high solubility in water, and provide improved properties of corrosion resistance and water resistance of the resulting cured coatings or films. In addition, the reactive epoxy compounds of the present invention have amide bond, which exhibits excellent stability and is hard to hydrolysis. Furthermore, because the amide bond can form hydrogen bond when reacting with water, the reactive epoxy compounds of the present invention can dissolve in water to maintain emulsion stability for epoxy resins.

While we have described this disclosure with regard to several embodiments, those embodiments should be regarded as exemplary and not limiting, as those skilled in the art, to which this disclosure is directed, will readily envision modification of the embodiments, or new embodiments, without the exercise of invention.

We claim:

1. A reactive epoxy compound represented by one formula selected from the group of formulas (S1), (S2), (S3), (S4) and (S5):

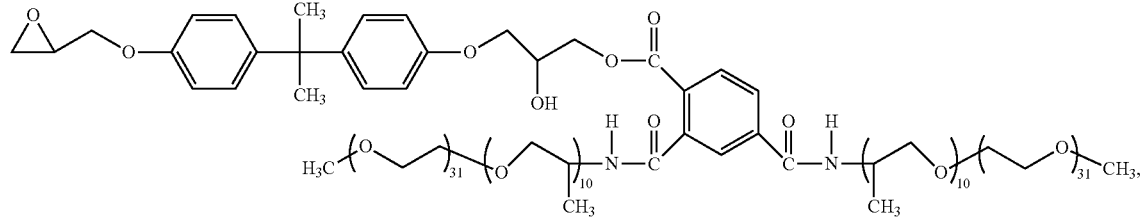

(S1)

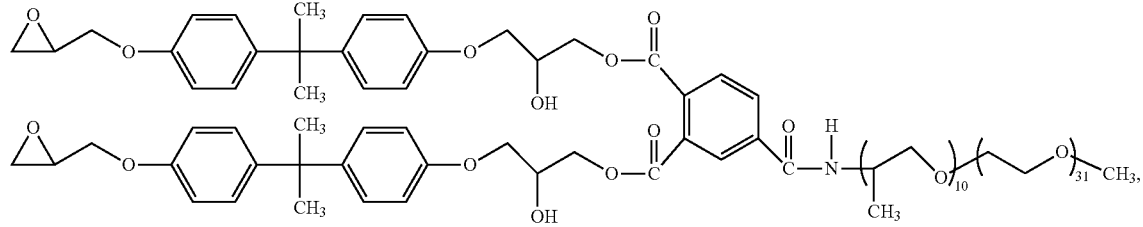

(S2)

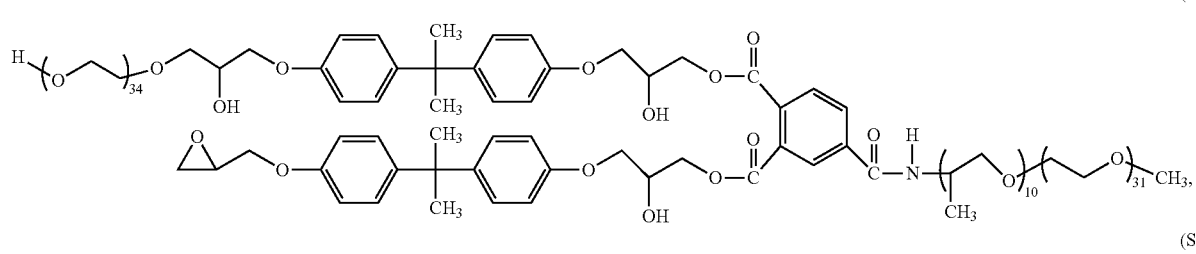

(S3)

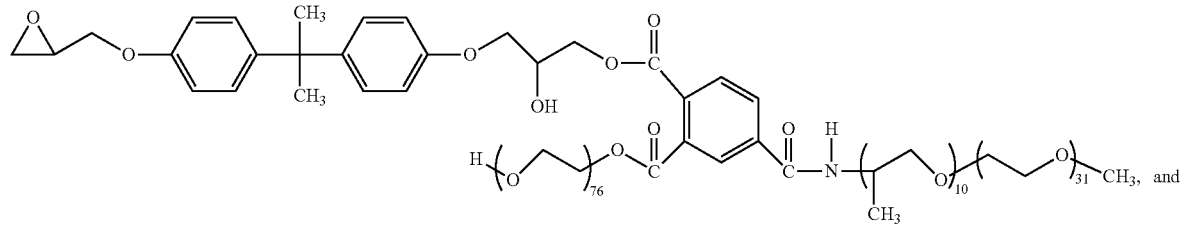

(S4)

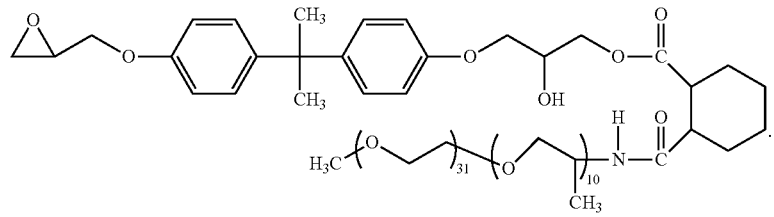

(S5)

2. The reactive epoxy compound of claim 1, having the structural formula (S1):

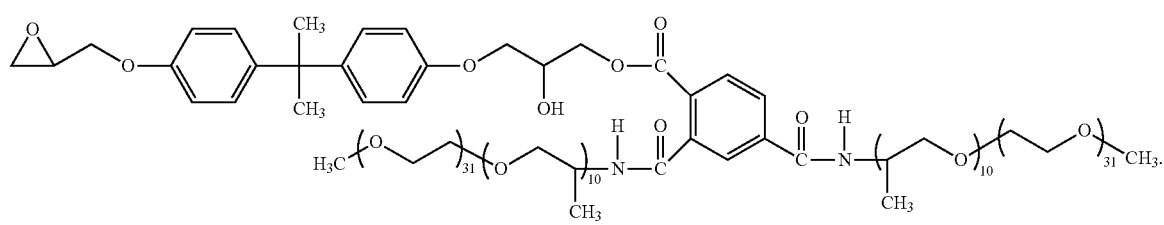

(S1)

3. The reactive epoxy compound of claim 1, having the structural formula (S2):
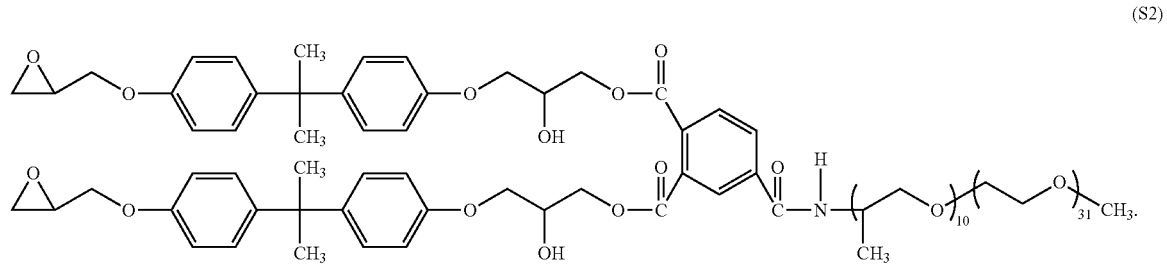
(S2)
4. The reactive epoxy compound of claim 1, having the structural formula (S3):
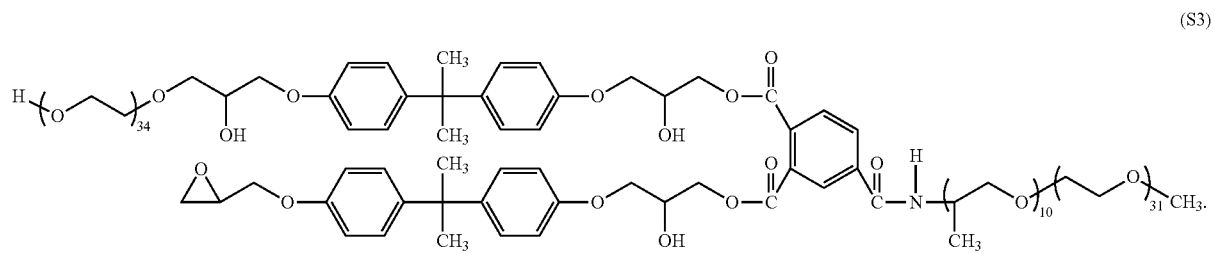
(S3)
5. The reactive epoxy compound of claim 1, having the structural formula (S4):
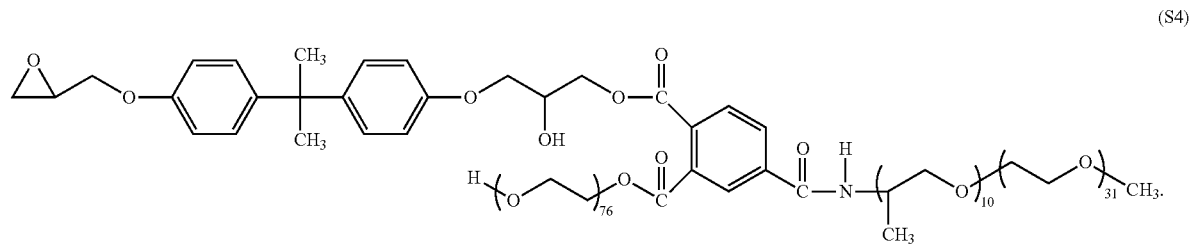
(S4)
6. The reactive epoxy compound of claim 1, having the structural formula (S5):
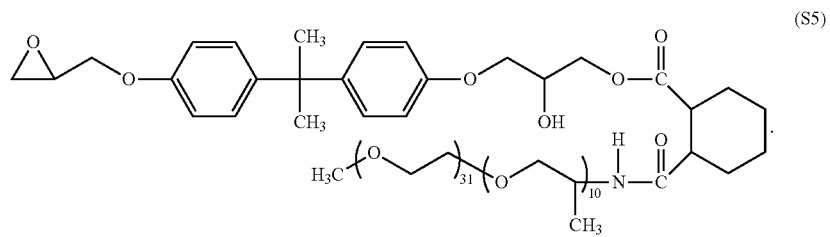
(S5)

7. A core-shell epoxy resin particle, comprising:
an epoxy resin encapsulated in a reactive epoxy compound,
wherein the reactive epoxy compound represented by general formula (I):

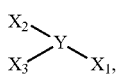
(I)

wherein
Y represents an aliphatic, cycloaliphatic, or an aromatic group;
$X_1$ represents

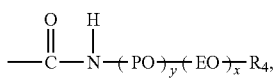

wherein $R_4$ is an organic linking group;
$X_2$ represents

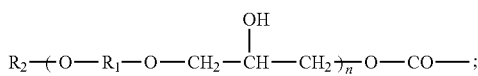

wherein $R_1$ is an organic linking group; $R_2$ represents glycidyl ether groups, or

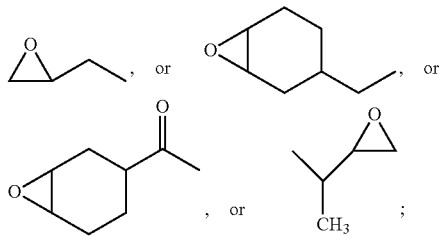

$X_3$ represents $R_3$—$(CO)_z$—; wherein $R_3$ is hydrogen or an organic linking group;
n represents the number of repeating units and is an integer of from 1 to 20;
x represents the number of repeating units and is an integer of from 0 to 40;
y represents the number of repeating units and is an integer of from 0 to 40;
and z represents the number of repeating units and is an integer of from 0 to 10.

8. A waterborne epoxy resin composition, comprising:
the core-shell type epoxy resin particles according to claim 7 dispersed in a solvent.

9. The waterborne epoxy resin composition of claim 8, wherein the core-shell type epoxy resin particles have a distribution of particle size such that $D_{50}$ of the particle size is less than about 0.7 μm.

10. The waterborne epoxy resin composition of claim 8, wherein the reactive epoxy compound is of the structure of formula (S1)

(S1)
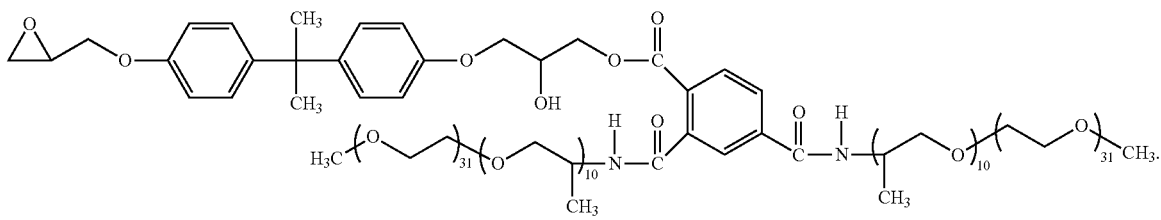

11. The waterborne epoxy resin composition of claim 8, wherein the reactive epoxy compound is of the structure of formula (S2)

(S2)
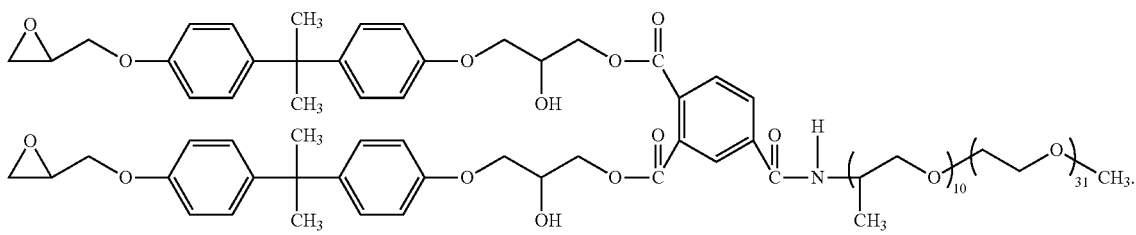

12. The waterborne epoxy resin composition of claim 8, wherein the reactive epoxy compound is of the structure of formula (S3)

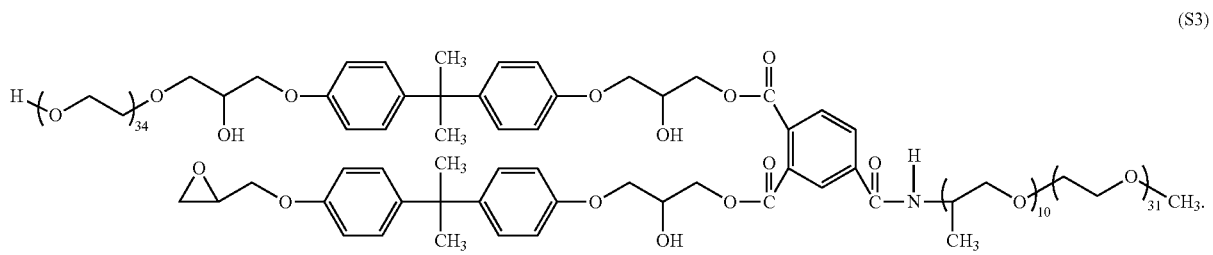

(S3)

13. The waterborne epoxy resin composition of claim 8, wherein the reactive epoxy compound is of the structure of formula (S4)

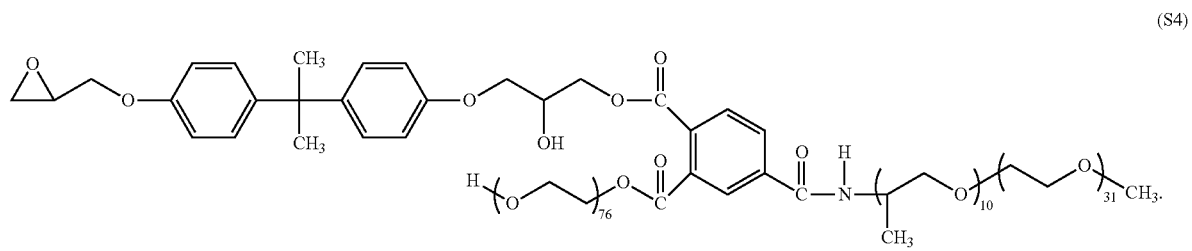

(S4)

14. The waterborne epoxy resin composition of claim 8, wherein the reactive epoxy compound is of the structure of formula (S5)

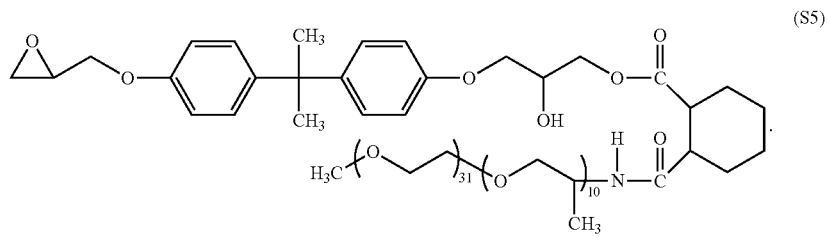

(S5)

15. A coating composition, comprising:
the waterborne epoxy resin composition according to claim 8.

* * * * *